US009641752B2

(12) United States Patent
Mattes

(10) Patent No.: US 9,641,752 B2
(45) Date of Patent: May 2, 2017

(54) SYSTEMS AND METHODS FOR IMAGING IDENTIFICATION INFORMATION

(71) Applicant: Jumio Corporation, Palo Alto, CA (US)

(72) Inventor: Daniel Herbert Mattes, Wels (AT)

(73) Assignee: Jumio Corporation, Palo Alto, CA (US)

( * ) Notice: Subject to any disclaimer, the term of this patent is extended or adjusted under 35 U.S.C. 154(b) by 0 days.

(21) Appl. No.: 15/014,690

(22) Filed: Feb. 3, 2016

(65) Prior Publication Data

US 2016/0227109 A1 Aug. 4, 2016

Related U.S. Application Data

(60) Provisional application No. 62/111,444, filed on Feb. 3, 2015.

(51) Int. Cl.

| | |
|---|---|
| ***H04N 5/232*** | (2006.01) |
| ***G06K 9/00*** | (2006.01) |
| ***G06Q 20/40*** | (2012.01) |
| ***H04N 1/00*** | (2006.01) |

(52) U.S. Cl.

CPC ..... *H04N 5/23222* (2013.01); *G06K 9/00228* (2013.01); *G06K 9/00483* (2013.01); *G06Q 20/4014* (2013.01); *H04N 1/00* (2013.01)

(58) Field of Classification Search

CPC ............................. H04N 5/23222; H04N 1/00

See application file for complete search history.

(56) References Cited

U.S. PATENT DOCUMENTS 6,128,398 A 10/2000 Kuperstein et al.
6,201,548 B1 3/2001 Cariffe et al.
(Continued)

FOREIGN PATENT DOCUMENTS

CN 101022489 A 8/2007
KR 2002-0011052 A 2/2002
(Continued)

OTHER PUBLICATIONS

Abulafia, Office Action, U.S. Appl. No. 12/502,269, Apr. 20, 2015, 23 pgs.

(Continued)

*Primary Examiner* — James Hannett
(74) *Attorney, Agent, or Firm* — Morgan, Lewis & Bockius LLP

(57) ABSTRACT

Described herein are techniques for acquiring an image of a user's credential document through a user device. A method includes capturing information from a user interface regarding a particular type of credential document to be imaged, receiving a video stream of the user's credential document from a camera of the user device, displaying the video stream on a display of the user device, and determining whether a set of criteria for capturing the image of the user's credential document are satisfied. If the criteria are not satisfied, the method presents a first indication on the user device that the user's credential document is not ready to be imaged. If the criteria are satisfied, the method presents a second indication on the user device that the user's credential document is ready to be imaged and captures an image of the user's credential document.

20 Claims, 13 Drawing Sheets

(56) References Cited

U.S. PATENT DOCUMENTS

| | | | | |
|---|---|---|---|---|
| 6,873,715 | B2 | 3/2005 | Kuo et al. | |
| 7,118,032 | B2 | 10/2006 | Elliot et al. | |
| 7,143,942 | B2 | 12/2006 | Yamanaka et al. | |
| 7,653,183 | B2 | 1/2010 | Patel et al. | |
| 7,802,720 | B2 | 9/2010 | Yang | |
| 8,577,810 | B1 | 11/2013 | Dalit et al. | |
| 9,305,230 | B2 | 4/2016 | Abulafia et al. | |
| 2002/0065728 | A1 | 5/2002 | Ogasawara | |
| 2003/0173401 | A1 | 9/2003 | Yamagami | |
| 2004/0107170 | A1 | 6/2004 | Labrou et al. | |
| 2005/0009564 | A1 | 1/2005 | Hayaashi et al. | |
| 2005/0093999 | A1 | 5/2005 | Yamaya | |
| 2005/0247797 | A1 | 11/2005 | Ramachandran | |
| 2006/0129485 | A1 | 6/2006 | Hamzy et al. | |
| 2006/0144925 | A1 | 7/2006 | Jones | |
| 2006/0237530 | A1 | 10/2006 | Elliot et al. | |
| 2007/0156592 | A1 | 7/2007 | Henderson | |
| 2008/0040278 | A1 | 2/2008 | DeWitt | |
| 2008/0298588 | A1 | 12/2008 | Shakkarwar | |
| 2009/0110279 | A1 | 4/2009 | Jain et al. | |
| 2009/0173784 | A1 | 7/2009 | Yang | |
| 2009/0234773 | A1 | 9/2009 | Hasson | |
| 2009/0328166 | A1 | 12/2009 | Burch et al. | |
| 2010/0008535 | A1 | 1/2010 | Abulafia | |
| 2010/0078472 | A1 | 4/2010 | Lin et al. | |
| 2010/0171826 | A1 | 7/2010 | Hamilton et al. | |
| 2011/0276484 | A1 | 11/2011 | Pearson et al. | |
| 2015/0278593 | A1 * | 10/2015 | Panferov | G06K 9/00483 382/182 |
| 2016/0112645 | A1 * | 4/2016 | Amtrup | H04N 1/00251 348/333.01 |

FOREIGN PATENT DOCUMENTS

| | | | |
|---|---|---|---|
| KR | 2004-0046555 | A | 6/2004 |
| KR | 10-0724432 | B1 | 5/2007 |
| WO | WO 2003/047208 | A1 | 6/2003 |
| WO | WO 2005/066907 | A1 | 7/2005 |

OTHER PUBLICATIONS

Abulafia, Final Rejection, U.S. Appl. No. 12/502,269, Jun. 22, 2012, 22 pgs.

Abulafia, Office Action, U.S. Appl. No. 12/502,269, Dec. 15, 2011, 16 pgs.

Abulafia, Notice of Allowance, U.S. Appl. No. 12/502,269, Oct. 9, 2015, 8 pgs.

Abulafia, Office Action, U.S. Appl. No. 13/275,203, Sep. 16, 2013, 13 pgs.

Abulafia, Final Rejection, U.S. Appl. No. 13/275,203, Apr. 1, 2014, 20 pgs.

Abulafia, Office Action, U.S. Appl. No. 13/275,203, Jul. 23, 2014, 22 pgs.

Abulafia, Final Rejection, U.S. Appl. No. 13/275,203, Jan. 7, 2015, 18 pgs.

Abulafia, Notice of Allowance, U.S. Appl. No. 13/275,203, Nov. 23, 2015, 11 pgs.

Abulafia, Office Action, U.S. Appl. No. 15/059,767, May 12 2016, 6 pgs.

Abulafia, Final Office Action, U.S. Appl. No. 15/059,767, Nov. 23, 2016, 7 pgs.

Mattes, Office Action, U.S. Appl. No. 13/750,969, Apr. 13, 2015, 15 pgs.

Mattes, Final Rejection, U.S. Appl. No. 13/750,969, Aug. 26, 2015, 16 pgs.

Mattes, Office Action, U.S. Appl. No. 13/750,969, May 6, 2016, 17 pgs.

Mattes, Office Action, U.S. Appl. No. 13/755,622, Mar. 4, 2015, 8 pgs.

Mattes, Final Rejection, U.S. Appl. No. 13/755,622, Oct. 16, 2015, 11 pgs.

Mattes, Office Action, U.S. Appl. No. 13/755,622, Jun. 10, 2016, 15 pgs.

Simon, Know the latest credit card fraud techniques, Nov. 2, 2006, 2 pgs.

* cited by examiner

First indication 900

SYSTEMS AND METHODS FOR IMAGING IDENTIFICATION INFORMATION

RELATED APPLICATIONS

This application relates to and claims priority to U.S. Provisional Patent Application No. 62/111,444, filed on Feb. 3, 2015, and titled "Systems and Methods for Imaging Identification Information," which is hereby incorporated herein by reference in its entirety.

FIELD OF THE INVENTION

The disclosed subject matter relates generally to the field of identification and/or payment systems and methods, and more particularly to imaging identification information.

BACKGROUND

User identification and payment verification are important for transactions between consumers and merchants and service providers. Traditionally, merchants and service providers have implemented many procedures during in-store transactions to prevent identity and/or payment fraud. For example, when a consumer pays for his/her shopping with a credit/debit card, sales personnel can request the consumer to present signed photo identification. Sales personnel can then verify whether or not the consumer is the authorized user of the tendered credit/debit card through one or more of the following procedures: (1) comparing the photograph on the photo identification with the consumer's actual appearance; (2) comparing the name on the photo identification with the name on the credit/debit card; and (3) comparing the signature on the photo identification with the signature on the credit/debit card sale receipt. Additionally, sales personnel can visually inspect the photo identification and the credit/debit card to assess whether or not the documents are authentic.

The proliferation of online transactions presents significant challenges to merchants and service providers in terms of preventing fraud. Because merchants and service providers do not meet consumers in person during online transactions, many fraud-prevention procedures implemented during in-store transactions are no longer practical for online transactions. In one case, merchants and service providers may ask consumers to transmit copies of their credential documents through facsimile, email, or other online communication methods. However, this alternative may discourage potential consumers due to its time-consuming nature and the privacy concerns of transmitting sensitive documents. In another case, merchants and service providers may ask consumers to complete an online order form, which typically requires, among other items, the name on a credit/debit card, the billing address, the card number, and the card's expiration date. This alternative, however, does not allow merchants or service providers to crosscheck a consumer's payment credential documents against the consumer's identification credential documents. As illustrated by the previous two alternatives, during online transactions, merchants and service providers must often make a tradeoff between transactional security and consumer convenience.

It has been proposed to allow users to scan identification credential documents for use in on-line transactions. Problems occur when scanning such identification credential documents. Sometimes, for instance, a user does not capture all of the identification credential document or the document is unreadable for some reason.

Therefore, there is a need in the art to overcome one or more of the deficiencies set forth above.

SUMMARY

In accordance with the disclosed subject matter, systems and methods are described for obtaining and using identification information.

One embodiment of the invention is a method of acquiring an image of a user's credential document through a user device. The method comprises capturing information from a user interface regarding a particular type of credential document to be imaged, receiving a video stream of the user's credential document from a camera of the user device, displaying the video stream on a display of the user device, and determining whether a set of criteria for capturing the image of the user's credential document is satisfied. The criteria can include (1) the video stream including a complete surface of the user's credential document, (2) the video stream indicating that the user's credential document is within a threshold distance of the user device, (3) the video stream indicating that the user's credential document is in focus, and (4) the video stream of the user's credential document being recognized to match the particular type of credential document to be imaged from the captured information. If the criteria are not satisfied, the method presents a first indication on the user device that the user's credential document is not ready to be imaged. If the criteria are satisfied, the method presents a second indication on the user device that the user's credential document is ready to be imaged and captures an image of the user's credential document.

Another embodiment of the invention is a non-transitory computer readable medium that is configured to execute computer readable instructions to cause a computer to perform the steps set forth above.

These and other capabilities of embodiments of the disclosed subject matter will be more fully understood after a review of the following figures, detailed description, and claims.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be made to the accompanying drawings and descriptive matter in which there are illustrated preferred embodiments of the disclosed subject matter.

BRIEF DESCRIPTION OF THE DRAWINGS

The disclosed subject matter is illustrated in the figures of the accompanying drawings which are meant to be exemplary and not limiting, in which like references are intended to refer to like or corresponding part, and in which.

DETAILED DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter. Numerous changes in the details of implementation of the disclosed subject matter can be made without departing from the spirit and scope of the disclosed subject matter. Features of the disclosed embodiments can be combined and rearranged in various ways.

The disclosed systems and methods enable a user to scan identification/payment documents such as passports, driver's licenses, other identification cards, credit cards, or debit cards (collectively referred to as user credential documents) by using a camera. The captured information can be further processed and validated by a client-server system. The disclosed methods and systems make it easier to capture an image of a user's credential document (or some other type of document) so that it will be sufficient for optical character recognition (OCR) and other procedures used to capture information from the image. In addition, as discussed below largely in connection with FIG. 1, the imaged user credential document can be used as part of an identification credential verification system.

Figure 1:
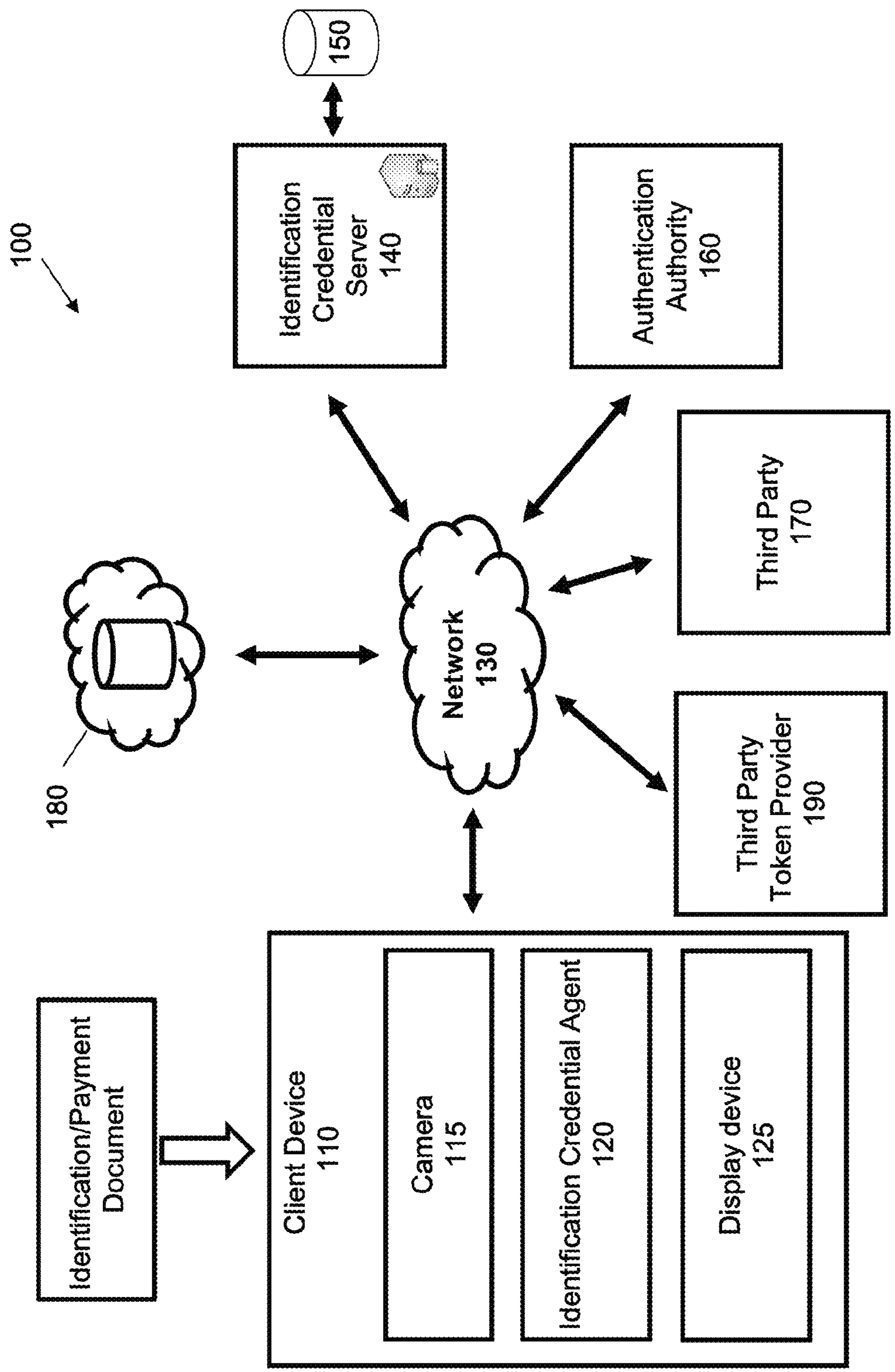
FIG. 1 illustrates a block diagram of the system according to one embodiment of the invention.

FIG. 1 illustrates an exemplary client-server identification system environment 100 in accordance with an embodiment of the disclosed subject matter. The system environment 100 can include one or more user devices 110 (also called client devices), an identification credential server 140, a storage medium 150 associated with the server 140, an authentication authority 160, a third party 170, a cloud storage 180, and a third party token provider (TPTP) 190, which can all be coupled, directly or indirectly, to a network 130 via wired and/or wireless connection.

Each user device 110 can communicate with the identification credential server 140 to send data to, and receive data from, the identification credential server 140, e.g., across the network 130. Each user device 110 can be directly coupled to the identification credential server 140; alternatively, each user device 110 can be connected to the identification credential server 140 via any other suitable device, communication network, or combination thereof. For example, each user device 110 can be coupled to the identification credential server 140 via one or more routers, switches, access points, and/or communication network (as described below in connection with the network 130). Each user device 110 can be in the form of, for example, a desktop computer, a mobile computer, a tablet computer, a cellular device, a smartphone, or any computing systems that are capable of performing computation.

Each user device 110 can include a camera 115, an identification credential agent 120, and a display device 125. The camera 115 can capture an image of an identification document of a user. The camera 115 can be embedded inside the client device 110 as a hardware component or a combination of both a hardware component and a software module. Alternatively, the camera 115 can be separate from but coupled to the user device 110. The user device 110 can optionally process the captured image and then send the relevant information to the identification credential server 140 for further processing and validation. For instance, in some embodiments, the user device 110 can perform OCR on the captured image of a credential document. As an example, the camera 115 can be a camera in an embodiment in which the user device 110 is a smartphone. As another example, the camera 115 can be a web-camera in an embodiment in which the user device 110 is a desktop computer.

The identification credential agent 120 of the user device 110 can help support a service of obtaining and using identification credentials. The identification credential agent 120 can be embedded inside the user device 110 as a software module, a hardware component, or a combination of both. Alternatively, the identification credential agent 120 can be separate from but coupled to the user device 110. The user device 110 can communicate with the identification credential server 140 directly or via its identification credential agent 120. The structures, functions, and features of the identification credential agent 120 are described in detail later in this document.

The display device 125 of the user device 110 can help display the status of the camera 115 during the process that the camera 115 captures an image of an identification document of a user. The display device 125 can be embedded inside the user device 110 as a hardware component, or a combination of a hardware component and a software module. Alternatively, the display device 125 can be separate from but coupled to the user device 110. The display device 125 can be any output display, such as a consumer television, a computer monitor, a projector, or a display screen of any digital device. As an example, the display device 125 can be a display screen in an embodiment in which the user device 110 is a smartphone. As another example, the display device 125 can be an external monitor in an embodiment in which the user device 110 is a desktop computer. The structures, functions, and features of the display device 125 are described in detail later in this document.

The network 130 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. Although FIG. 1 illustrates the network 130 as a single network, the network 130 can include multiple interconnected networks listed above.

The identification credential server 140 can include an internal storage medium and can also be coupled to an external storage medium (e.g., the storage medium 150), which can be configured to store data for the identification credential server 140. Any user device 110 can also store data in, and access data from, the storage medium 150 via the identification credential server 140. Although FIG. 1 shows the identification credential server 140 and the storage medium 150 as separate components, the identification credential server 140 and the storage medium 150 can be combined together. In addition, although FIG. 1 shows the identification credential server 140 as a single server, the identification credential server 140 can include more than one physical and/or logical servers. Moreover, although FIG. 1 shows the storage medium 150 as a single storage medium, the storage medium 150 can include more than one physical and/or logical storage medium. The storage medium 150 can be located in the same physical location as the identification credential server 140, at a remote location, or any other suitable location or combination of locations. Each identification credential server 140 can be in the form of, for example, a desktop computer, a mobile computer, a tablet computer, a cellular device, a smartphone, or any computing systems that are capable of performing computation.

The authentication authority 160 can provide authentication service to the user device 110, the identification credential server 140, or other components of the system environment 100. The authentication authority 160 can be operated by, controlled by, or associated with the same entity that operates, controls, or is associated with the identification credential server 140; alternatively, the authentication authority 160 can be operated by, controlled by, or associated with a different entity, which may or may not be related. Although FIG. 1 shows the authentication authority 160 as a single server, the authentication authority 160 can include more than one physical and/or logical server.

The third party 170 can provide other relevant services to the user device 110, the identification credential server 140, or other components of the system environment 100. The third party 170 can be an online merchant or retailer from which users of the system environment 100 can purchase products. For example, the third party 170 can be a retailer e-commerce web service (e.g., BestBuy.com, etc.) which may need to verify a user's identification credentials (e.g., name and address). The third party 170 can also be a service provider that can provide a service to users of the system environment 100. For example, the third party 170 can be an online entertainment provider (e.g., gambling server) which may need to verify a user's identification credentials (e.g., age and nationality) for the opening of an account. The third party 170 can also be a service provider such as a bank, which may need to verify a user's identification credentials (e.g., age, current address, and nationality) for the opening of an account. The third party 170 can be operated by, controlled by, or associated with the same entity that operates, controls, or is associated with the identification credential server 140 and/or the authentication authority 160; alternatively, the third party 170 can be operated by, controlled by, or associated with a different entity, which may or may not be related. Although FIG. 1 shows the third party 170 as a single server, the third party 170 can include more than one physical and/or logical server. In addition, although FIG. 1 shows only a single third party 170, numerous third parties can be used within the scope of the invention.

The cloud storage 180 can store data from the storage medium 150 with the same restrictions, security measures, authentication measures, policies, and other features associated with the storage medium 150. FIG. 1 shows the cloud storage 180 separate from the network 130; however, the cloud storage 180 can be part of the network 130 or another network. The identification credential server 140 can use only the storage medium 150, only the cloud storage 180, or both. While FIG. 1 shows only one cloud storage 180, more than one cloud storage or any suitable combination thereof can be used.

The third party token provider (TPTP) 190 can provide tokens for the identification system environment 100. The TPTP 190 can be operated by, controlled by, or associated with the same entity that operates, controls, or is associated with the identification credential server 140, the authentication authority 160, and/or the third party 170; alternatively, the TPTP 190 can be operated by, controlled by, or associated with a different entity, which may or may not be related. Although FIG. 1 shows the TPTP 190 as a single server, the TPTP 190 can include more than one physical and/or logical server. In addition, although FIG. 1 shows only one TPTP 190, numerous TPTP's can be used within the scope of the invention.

Figure 2:
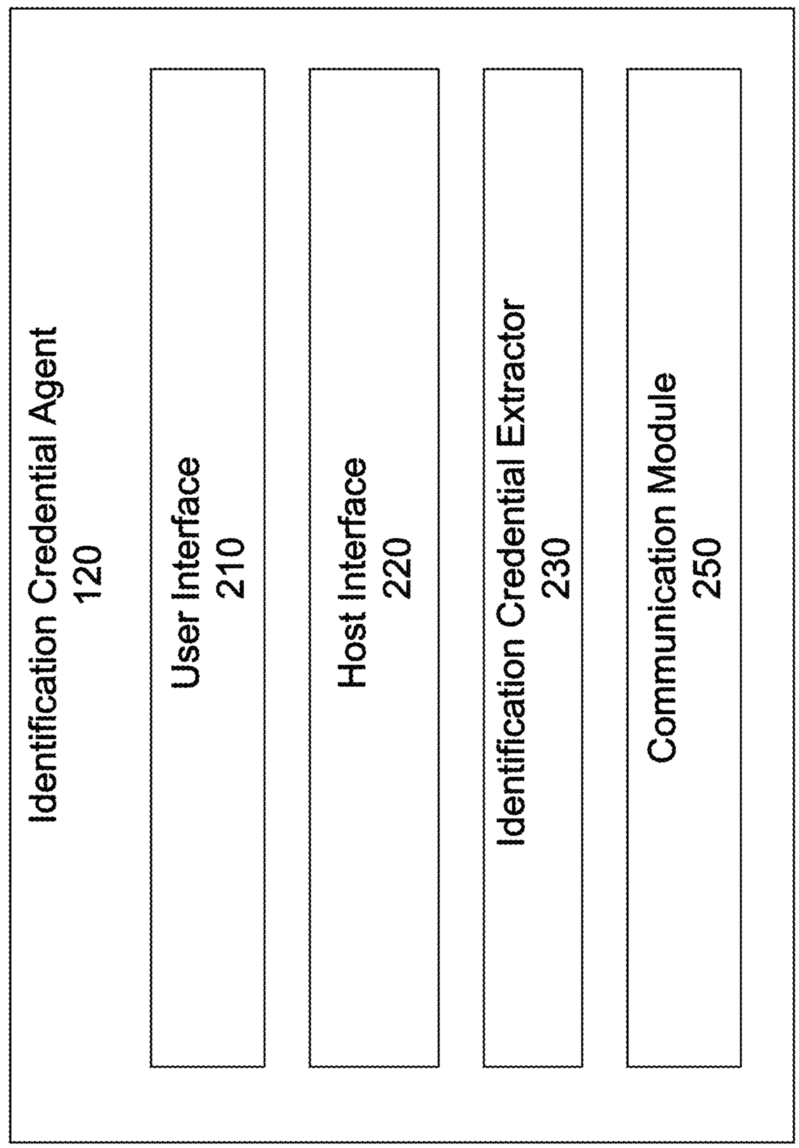
FIG. 2 illustrates a block diagram of the identification credential agent 120 of the embodiment of FIG. 1.

One or more user devices (e.g., 110 in FIG. 1) can participate in a client-server identification system environment (e.g., 100 in FIG. 1). A user device 110 can include an identification credential agent (e.g., 120 in FIG. 1). An exemplary identification credential agent 120 according to certain embodiments of the disclosed subject matter is illustrated in FIG. 2. The identification credential agent 120 can include a user interface 210, a host interface 220, an identification credential extractor 230, and a communication module 250. An identification credential agent 120 can have some or all of these components.

In use, the embodiment of FIG. 1 can be used to capture a user's credential document information and transmit it through the network 130 to the identification credential server 140, which can maintain lists of identification credential information associated with various users. The identification credential server 140 can thereafter be used to verify the identity of a particular user through use of credential information obtained through the user device 110 by imaging of a credential document for the user. Payment information (such as credit or debit card information) can also be captured through the user device 110 and stored in the identification credential server 140 for use in transactions. The maintenance of the user's identification information in the identification credential server 140 can be useful for use in verifying the identification of the user in a variety of transactions.

Figure 3:
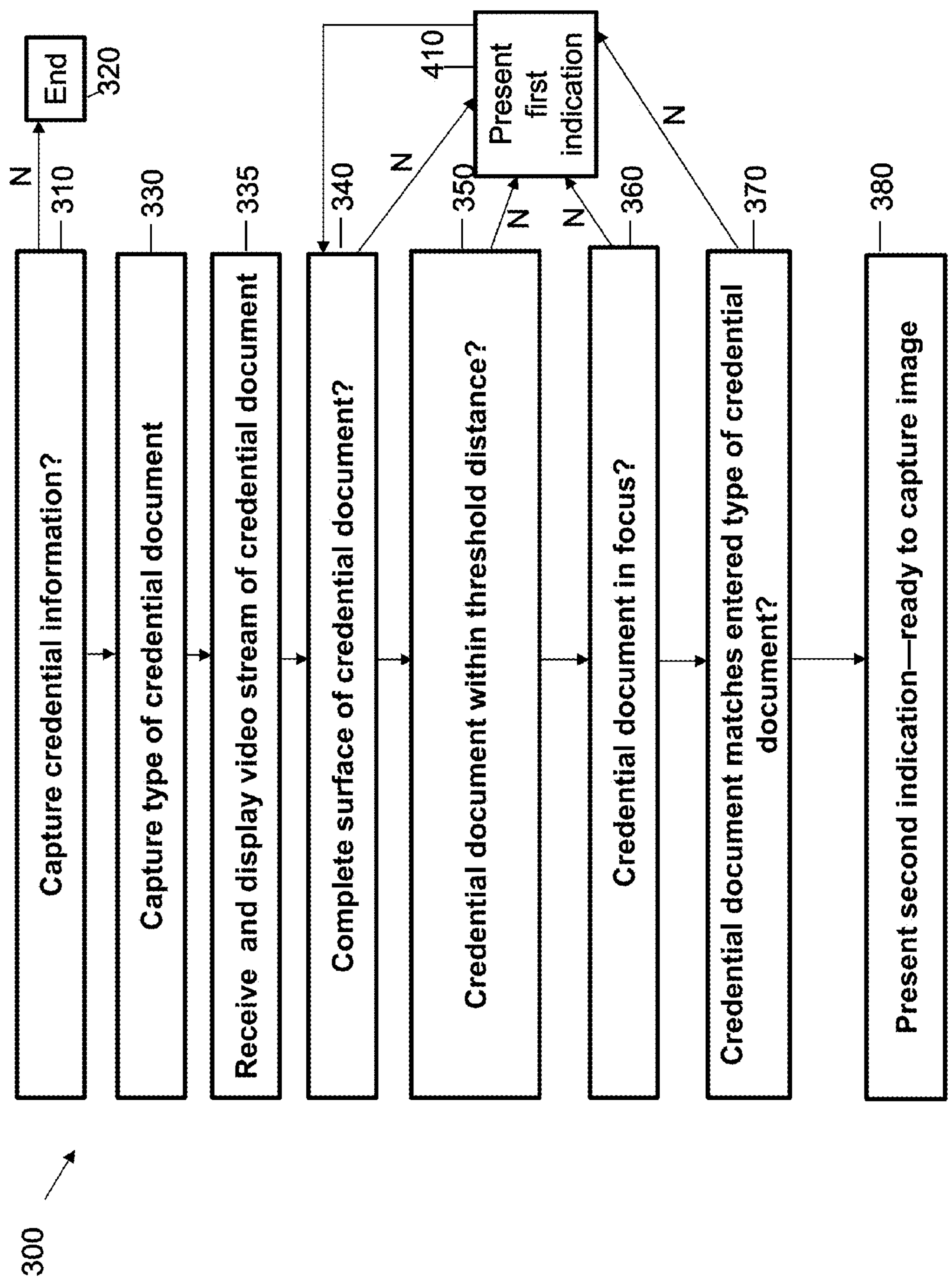
FIG. 3 illustrates a flow chart according to one embodiment of the invention.

FIG. 3 illustrates an exemplary operation 300 of obtaining identification/payment credentials of a user through imaging of a credential document, according to certain embodiments of the disclosed subject matter. The operation 300 can be modified by, for example, rearranging, changing, adding, or removing certain of the steps. FIG. 3 illustrates, for example, a set of steps that can be performed by the user device 110, the modules of the user device 110, or other modules of the client-server identification system environment 100. In one preferred embodiment, these steps are performed by the user device 110.

At step 310, the user device 110 decides whether or not to capture a user's identification/payment credential information using the camera 115 of FIG. 1. The decision can be based on one or more of a variety of criteria. For example, if a user of the client device 110 is performing a transaction, an application may require scanning of the user's credential information. In this example, the application can trigger the steps set forth herein. In other embodiments, a user can select an application for scanning or imaging of the user's identification credentials in order to trigger these steps.

If, at step 310, the user device 110 decides not to capture the user's identification/payment credential information, the operation 300 is completed, as represented by step 320. At step 320, the user interface 210 may additionally display a message indicating that the operation 300 is completed because no user's identification/payment credential needs to be captured. If, at step 310, the user device 110 decides to capture the user's identification/payment credential, the operation 300 proceeds to step 330. In FIG. 3, each box immediately below a box above it represents a step that takes place if the step above that box successfully takes place.

At step 330, in some embodiments, the user device 110 prompts the user to select a type of credentials to be captured by the camera 115. The credentials can be identification credentials such as passports, driver's licenses, or other identification cards. The credentials can also be payment credentials such as credit cards or debit cards. The user may be prompted to select a credential type from one of the following options: (a) a passport; (b) a driver's license; (c) an identification card; (d) a country's visa; (e) a credit card; or (f) a debit card. One or more of these options can be changed and/or removed. Additionally, more options can be added. In some embodiments, the user device 110 may prompt the user for additional information. As an example, if the user selects "passport," he/she may be prompted to choose or enter a country that corresponds to the passport, such as United States, Canada, Austria, or Germany. As another example, if the user selects "driver's license," he/she may be prompted to choose or enter a both a country and a state or province that corresponds to the driver's license, such as California, Massachusetts, or Ontario. In addition, the order of these selections can be changed, so that a user first enters a country and/or state or province for the document, and then the credential type (i.e., passport, license, identification card, etc . . . ). As yet another example, if the user selects "credit card," he/she may be prompted to choose or enter the type of credit card (such as Visa or MasterCard) or a financial institution that issued the credit card (such as US Bank or Bank of America). In some embodiments, the user device 110 may prompt the user to enter or select for additional information.

Figure 5:
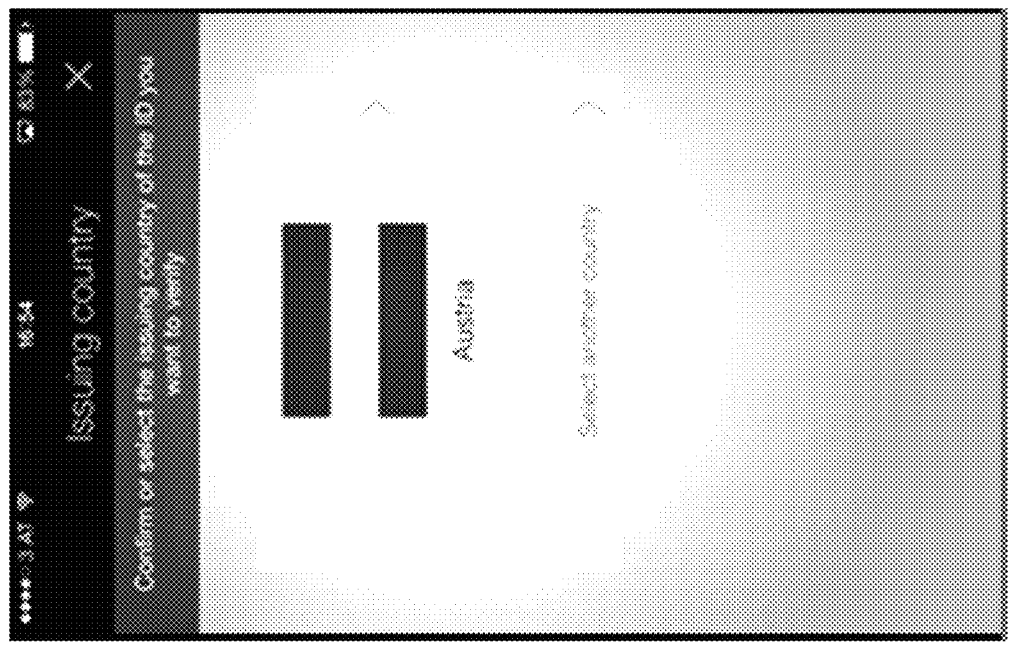
FIG. 5 illustrates a user interface screen for use in capturing information regarding a particular type of user credential document.
Figure 6:
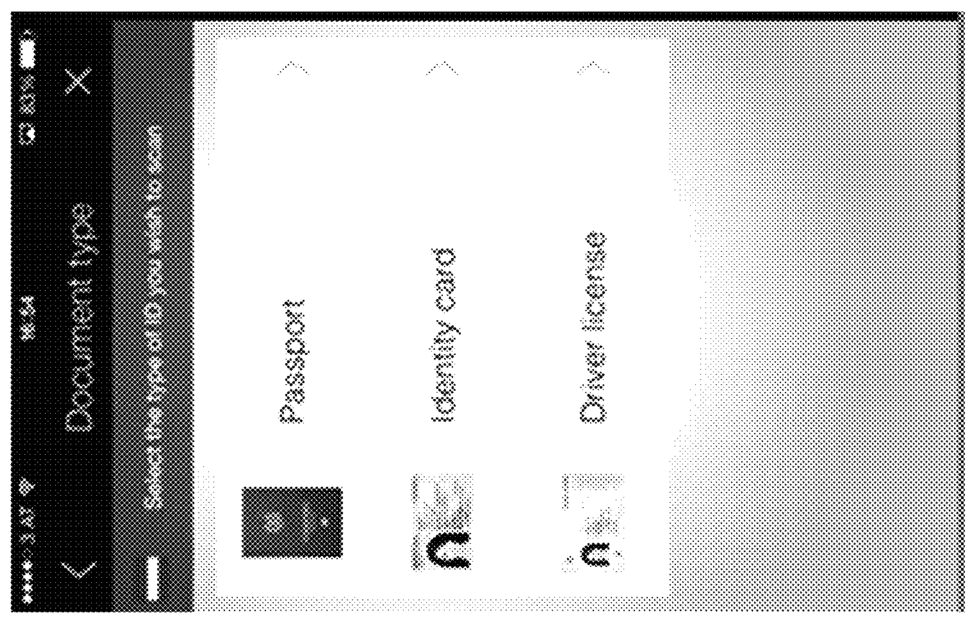
FIG. 6 illustrates a second user interface screen for use in capturing information regarding a particular type of user credential document.
Figure 7:
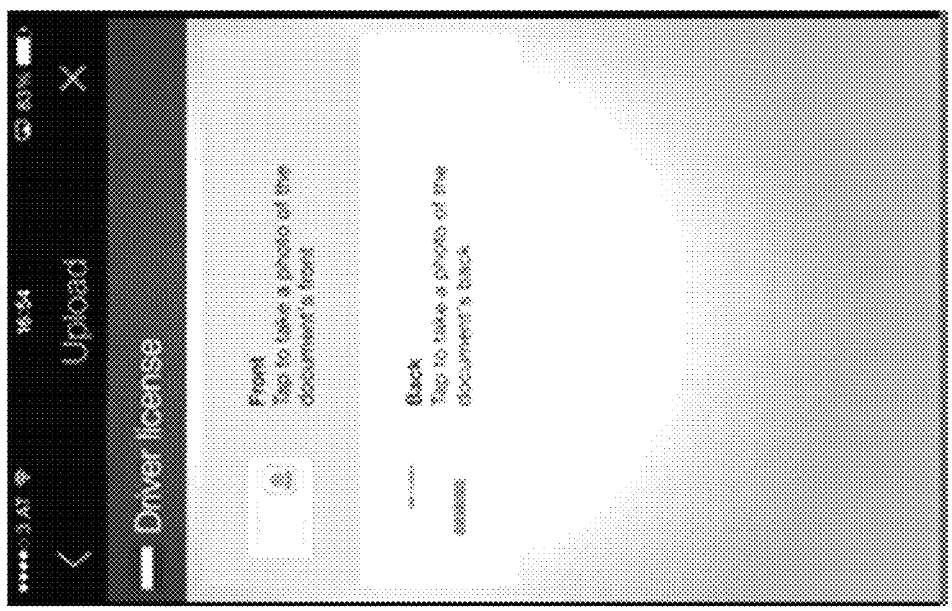
FIG. 7 illustrates a third user interface screen for use in capturing information regarding a particular type of user credential document.

FIGS. 5-7 illustrate three user interface screens for use in capturing information regarding a particular type of user credential document. FIG. 5, for example, prompts the user to select the issuing country of a document to be verified. FIG. 6, in turn, prompts the user to select the type of document the user wishes to scan. FIG. 7 then asks the user whether the user wants to scan the front or the back of the document chosen from FIGS. 5-6. In other embodiments, the user interface screens of FIGS. 5-7 can be presented in different orders. After the user makes a selection for each such screen, this information is saved within the user device for later use.

Referring again to FIG. 3, at step 335, the user presents the credential he/she selected in front of the camera 115 of the user device 110, and the camera 115 starts to receive a video stream of the credential document. The user interface 210 can display the received video stream on a display screen of the user device 110. The user interface 210 additionally renders a layer overlaying the displayed video stream. In some embodiments, the layer is translucent and is in a first color. In some embodiments, the layer is transparent and is surrounded by a frame with the first color. As an example, the first color can be red, which indicates that the image is not yet ready to be captured.

Next, the user device 110 determines whether or not the video stream captured by the camera 115 includes a proper image of the credential document. In one embodiment, the criteria can include whether: (1) the video stream includes a complete surface of the user's credential document, (2) the video stream indicates that the user's credential document is within a threshold distance of the user device, (3) the video stream indicates that the user's credential document is in focus, and (4) the video stream of the user's credential document is recognized to match the particular type of credential document to be imaged from the captured information. In other embodiments, additional criteria can be used, or fewer criteria can be used. In some embodiments, an analysis of the video stream of the credential document obtained using the camera 115 can be used for the determination regarding whether each criterion is met.

Referring again to FIG. 3, at step 340, the user device determines whether a complete surface of the credential document appears. The purpose of this step is to ensure that the entire credential document will be imaged if the image is captured with the camera 115. If, at step 340, the user device 110 determines that the video stream does not include a complete image of the credential document, a first indication is presented to the user at step 410. This first indication indicates to the user that the image is not yet ready to be captured. In one embodiment, this first indication is an overlay with a first color (such as red) over the video stream. In some embodiments, the overlay has a similar aspect ratio as the user's credential document, and the orientation of the overlay is changeable based on the orientation of the user's credential document presented. As discussed above, in some embodiments, the overlay is translucent with the first color. In some embodiments, the overlay is transparent and is surrounded by a frame with the first color. This first indication can be, for example, a red shading to the overlay to indicate that the credential document is not ready to be captured. The user can then adjust the distance between the credential document and the camera 115. The user can continually adjust this distance if needed. The user device 110 can continually re-determine whether or not the video stream includes the complete image of the credential document. If, at step 340, the user device 110 determines that the video stream includes the complete image of the credential, the operation proceeds to step 350. As shown in FIG. 3, the flow diagram loops back to step 340 after step 410.

Figure 8:
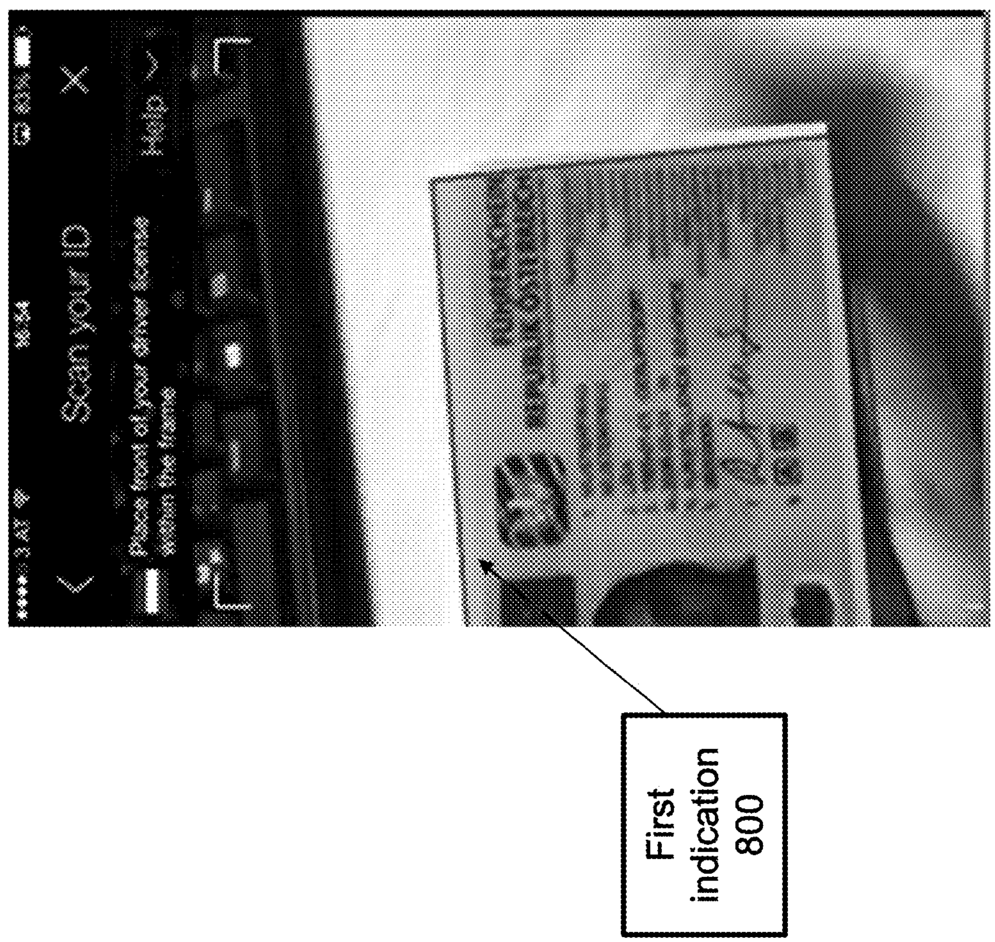
FIGS. 8-9 illustrate embodiments in which a user's credential document is not ready to be imaged.
Figure 9:
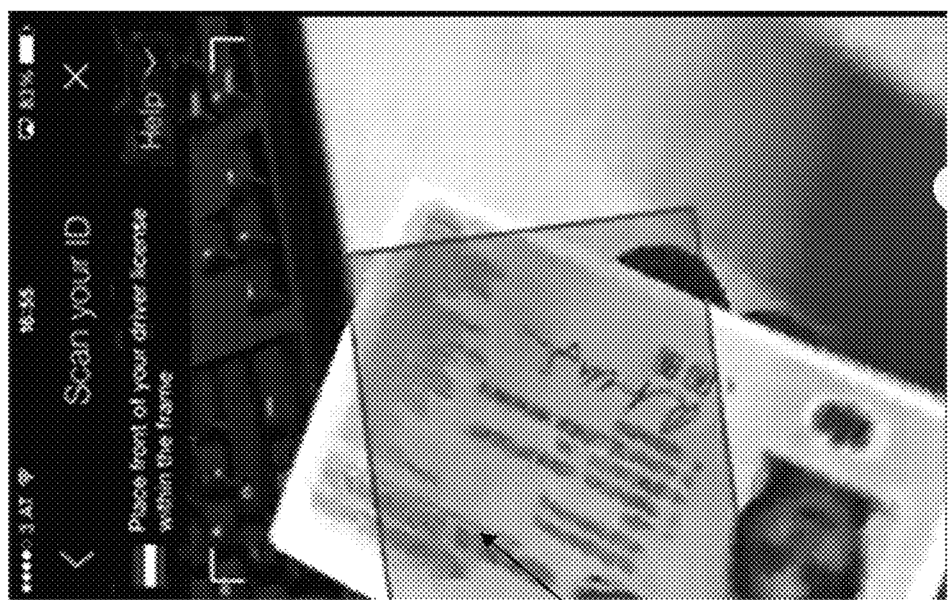

FIGS. 8-9 illustrate embodiments of a screen shot on the display of the user device 110 in a case in which a user's credential document is not ready to be imaged. In these figures, for instance, the credential document is not properly placed in front of the camera 115, and a first indication 800, 900 is placed on the screen to indicate this to the user. In this specific case, an overlay that is a certain specified color (such as red) is displayed to indicate to the user that the image is not ready to be captured.

At step 350, the user device 110 determines whether or not the distance between the credential document and the camera 115 is less than a threshold distance. As an example, the threshold distance can be in the range of 2 inches to 1 yard. The purpose of this determination is to ensure that the credential document is large enough in the video stream so that it will be easily legible. The determination can be based on one or more of pre-determined criteria. Some non-limiting examples of the pre-determined criteria for determining whether the credential document is within a predetermined distance include: (1) the user device 110 identifies all corners of the credential document captured in the video stream; (2) the user device 110 identifies all edges of the credential document captured in the video stream; and (3) the aspect ratio of the credential document captured in the video stream corresponds to the aspect ratio of the type of the credential document indicated by the user. One or more of these criteria can be changed and/or removed. Additionally, more criteria can be added. Further, a simple estimation of the distance to the document can be used for this step. If the credential document is not within the predetermined threshold distance, the first indication is presented to the user at step 410.

At step 360, the user device 110 determines whether the credential document is in focus. This can be important because it may be difficult to OCR the credential document if it is not in focus. In addition, if the user does not steadily present the credential document in front of the camera, it may be difficult to get it in focus. If the credential document is not in focus, the first indication is presented to the user at step 410.

At step 370, the user device 110 verifies whether or not the credential document presented by the user is the same type as the user indicated at step 330. The user device 110 may verify the type of the presented identification based on certain features or characteristics captured with the camera 115, such as a logo, a trademark, or a layout of the document. As an example, if the user presented a Massachusetts driver's license, and he/she indicated it as a California driver's license, then step 370 would not pass because one or more characteristics captured with the camera 115 about the Massachusetts driver's license do not conform with a California driver's license, and the first indication would be presented to the user at step 410. As another example, if the user presented a passport, and he/she indicated it as a driver's license, then step 370 would not pass because one or more characteristics captured with the camera 115 about the passport do not conform with a driver's license, and the first indication would be presented to the user at step 410. As yet another example, if the user presented the back side of a credit card, and he/she indicated it as the front side of a credit card, then step 370 would not pass because one or more characteristics captured with the camera 115 about the back side of the credit card do not conform with the front side of the credit card, and the first indication would be presented to the user at step 410. In some embodiments, the determination at step 370 can also involve comparing a photo in the user's identification/payment credential document to the user's actual face captured by the camera 115 of the user device 110.

At step 380, if each of the criteria above are passed and the user's credential document is in front of the camera 115 of the user device 110, a second indication is presented to the user that indicates that the user's credential is ready to be captured. In one embodiment, this second indication is an overlay with a second color (such as green) over the video stream. In some embodiments, the overlay has a similar aspect ratio as the user's credential document, and the orientation of the overlay is changeable based on the orientation of the user's credential document presented. As discussed above, in some embodiments, the overlay is translucent with the second color. In some embodiments, the overlay is transparent and is surrounded by a frame with the second color. This second indication can be, for example, a green shading to the overlay to indicate that the credential document is ready to be captured. The user can then capture the image.

Figure 10:
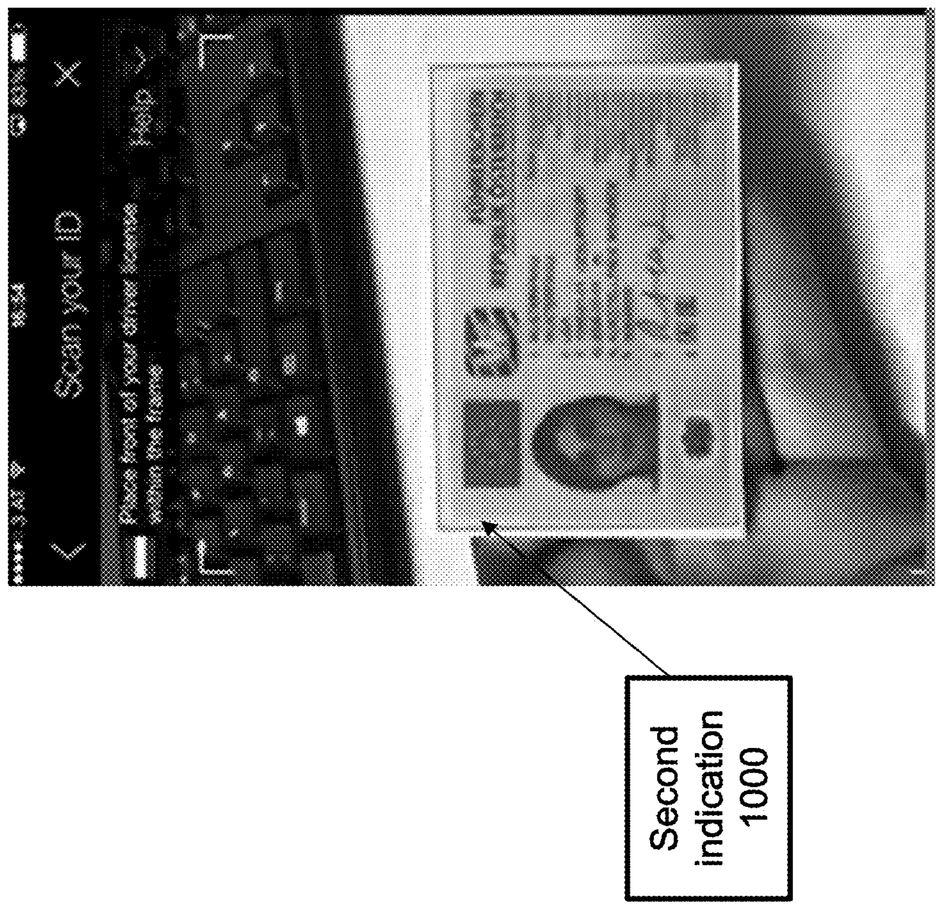
FIGS. 10-11 illustrate embodiments in which a user's credential document is ready to be imaged.
Figure 11:
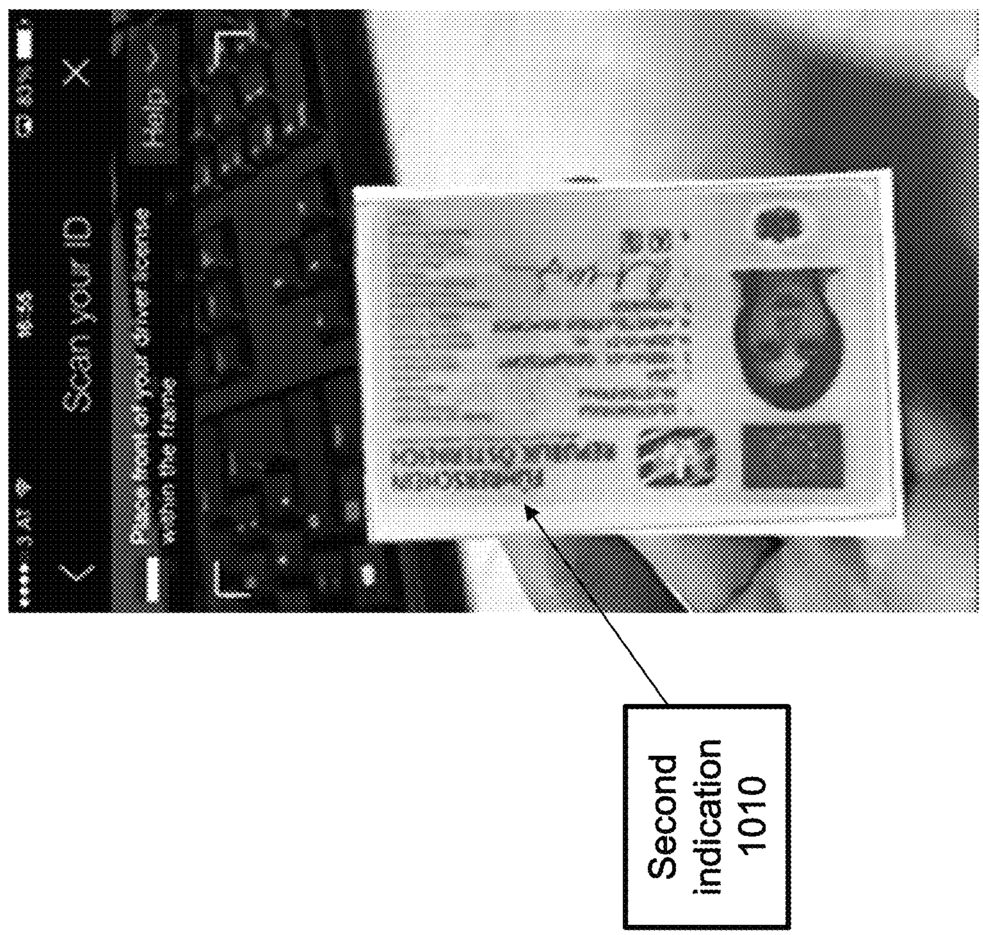
Figure 12:
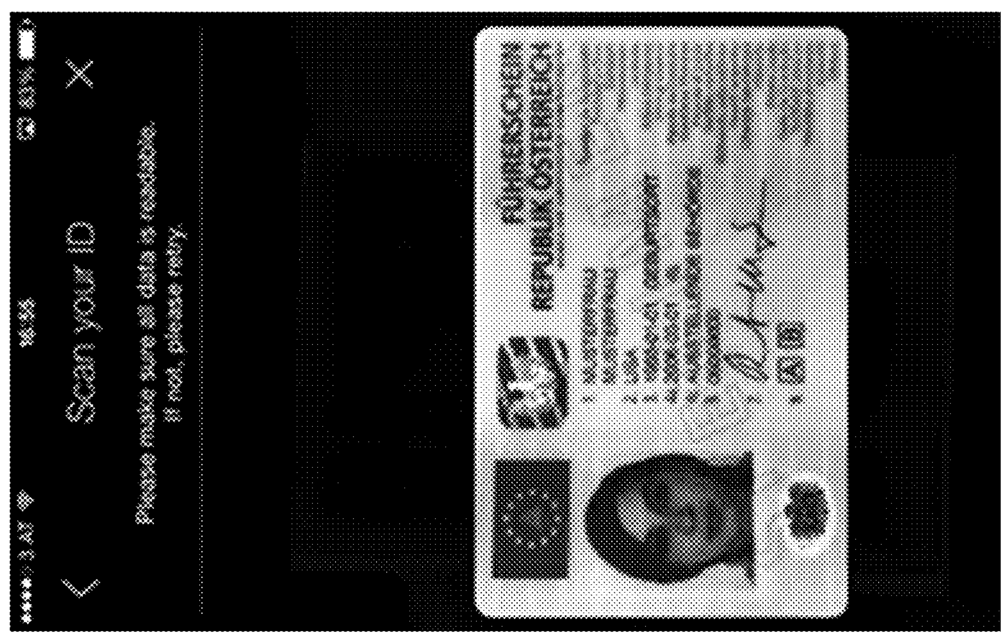
FIG. 12 illustrates an embodiment of the successful capture of a user's credential document according to one embodiment of the invention.

FIGS. 10-11 illustrate embodiments of a screen shot on the display of the user device 110 in a case in which a user's credential document is ready to be imaged. In these figures, for instance, the credential document is properly placed in front of the camera 115, and a second indication 1000, 1010 is placed on the screen to indicate this to the user. In this specific case, an overlay that is a certain specified color (such as green) is displayed to indicate to the user that the image is ready to be captured. After the user activates the camera 115 to capture the image, the captured image can be displayed to the user as shown in FIG. 12. In addition, in some embodiments, the user device 110 can automatically capture the image when the criteria set forth above are satisfied. Further, after capturing the image, the user device 110 can optionally perform OCR on the image and extract identification information from it. Further, one or both of the extracted identification information or the image of the credential document itself can be transmitted to the identification credential server 140 for use as discussed above.

As described above, the method and system of the invention helps to ensure that captured user credential information is in a condition that will allow it to be easily OCR'd so that it can be used for identification purposes. In other embodiments, a similar procedure can be followed for credit or debit card purposes. The steps in FIG. 3 can be carried out in a variety of orders, not merely in the order set forth in FIG. 3. In addition, steps 340, 350, 360, and 370 can be collectively analyzed and a determination performed on them at essentially the same time, or they can be analyzed sequentially in any desired order.

In addition to the steps set forth above, additional steps can also be used within the scope of the invention. For instance, the decision about whether or not to capture a photo of the user's face by the camera 115 can be based on one or more of pre-determined criteria. Some non-limiting examples of the pre-determined criteria include whether: (1) the user's identification/payment credential captured by the camera 115 does not contain a face image; (2) a photo of the user's face has been previously acquired and validated; or (3) the underlying transaction does not additionally require a photo of the user's face. One or more of these criteria can be changed and/or removed. Additionally, more criteria can be added.

As set forth above, the camera 115 can be used to capture a photo of the user's face. The camera may take additional steps to ensure the photo of the user's face satisfies one or more of the following criteria: (1) the photo of the user's face captured by the camera 115 includes the user's complete face; (2) when the camera 115 captures the photo of the user's face, the distance between the user's face and the camera 115 is within a threshold distance; (3) the photo of the user's face captured by the camera 115 is in focus; (4) the user's face is of a live person before the image of the person's face is taken (to ensure that an image of a photograph of a person's face is not taken instead of the person's actual face). One or more of these criteria can be changed and/or removed. Additionally, more criteria can be added.

In addition, the user device 110 can compare the photo in the user's identification/payment credential document to the user's actual face captured by the camera 115. If the photo in the user's identification/payment credential document matches the user's actual face captured by the camera 115, this can help in verifying the credential document. In addition, the user's captured face information can be used to determine whether the document type matches the type in the video display (i.e., step 370 of FIG. 3).

In alternative embodiments, if the user device 110 determines that a set of criteria (e.g., one or more criteria described in steps 340-370) for capturing the image of the user's credential document are satisfied, the user device 110 can automatically capture the image of the user's credential document without presenting the second indication as described in step 380. In such alternative embodiments, the operation 300 of FIG. 3 can remain as it is, with the exception of step 380, which can be changed from presenting a second image to automatically capturing the image of the user's credential. In addition, in some embodiments, the first indication can simply be a box or overlay to indicate the proper outline of the identification credential to aid the user in moving the camera so that the identification credential fits within the box or overlay so that it can be captured by a photograph. For example, in one such embodiment, the first indication is such a box or overlay, and when each of the four criteria in steps 340-370 are satisfied, the user device 110 can automatically capture the image of the user's credential document. This saves the user from having to press a button to capture the image. In other such embodiments, less than all four of the criteria in steps 340-370 (such as one, two, or three) are required to be satisfied for such an automatic capturing of the image. In some embodiments, the box or overlay has a similar aspect ratio as the user's credential document, and the orientation of the box or overlay is changeable based on the orientation of the user's credential document presented. In some embodiments, the overlay is translucent. In some embodiments, the overlay is transparent and is surrounded by a frame. In some embodiments, the overlay can also include a sample layout of the credential document that is to be imaged. For example, if the user indicates that the front side of a credit card is to be imaged, then the overlay can include a layout with typical content on the front side a credit card, such as a credit card number, an expiration date, and a cardholder's name, in order to remind the user to present the proper side of the credit card. In some embodiments, if the user device 110 needs to capture the user's actual face, the overlay can have an outline of human's face to aid the user in moving the camera 115 so that the user's actual face fits within the overlay so that it can be captured by a photograph. Further, after the image is taken, the user device can display the captured image on the screen of the device and allow the user to re-capture the image if desired.

As discussed above, after capturing the image of the user's credential document, the user device 110 can optionally perform OCR on the image and extract identification information from it. In some embodiments, the user device 110 can display the extracted information, and the user can confirm whether or not the extracted information is accurate.

Figure 13:
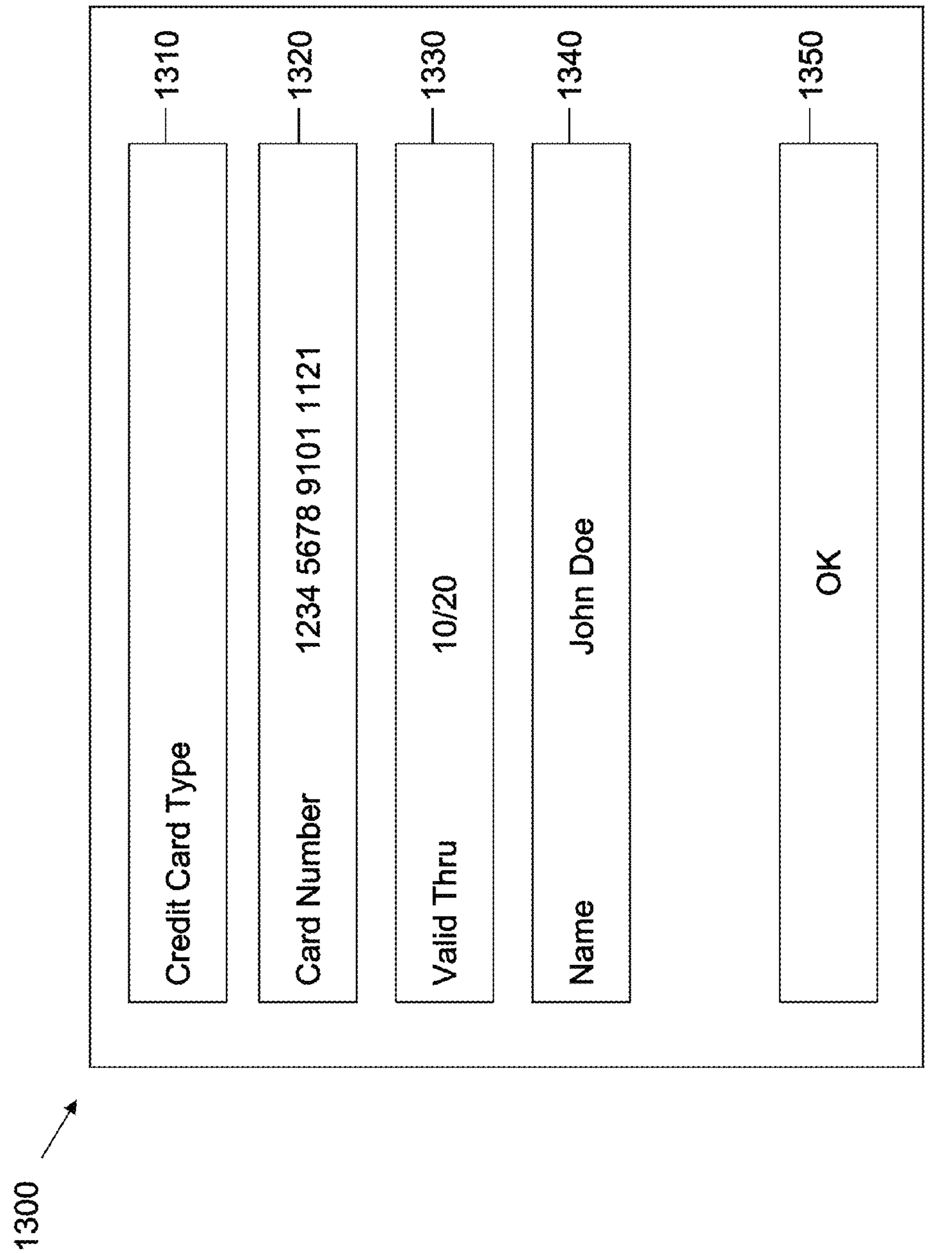
FIG. 13 illustrates a display of information extracted from a user's credential document according to one embodiment of the invention.

FIG. 13 illustrates a display 1300 of information extracted from a user's credential document according to one embodiment of the invention. In FIG. 13, the user's credential document is a credit card. The display 1300 includes the following five components: a credit card type 1310 (e.g., Visa, MasterCard, American Express, etc), a card number 1320, an expiration date 1330, a cardholder's name 1340, and a confirmation 1350. In some embodiments, one or more of the components can be changed and/or removed. Further, additional components can be added. For example, one or more components can be added, removed, or changed if other types of user's credential documents are imaged. If the user confirms that the extracted information is accurate, the user can tap or click on component 1350. The extracted identification information and/or the image of the credential document itself can then be transmitted to the identification credential server 140. In some embodiments, the extracted identification information and/or the image of the credential document itself can be alternatively or additionally saved locally on the user device 110.

Figure 4:
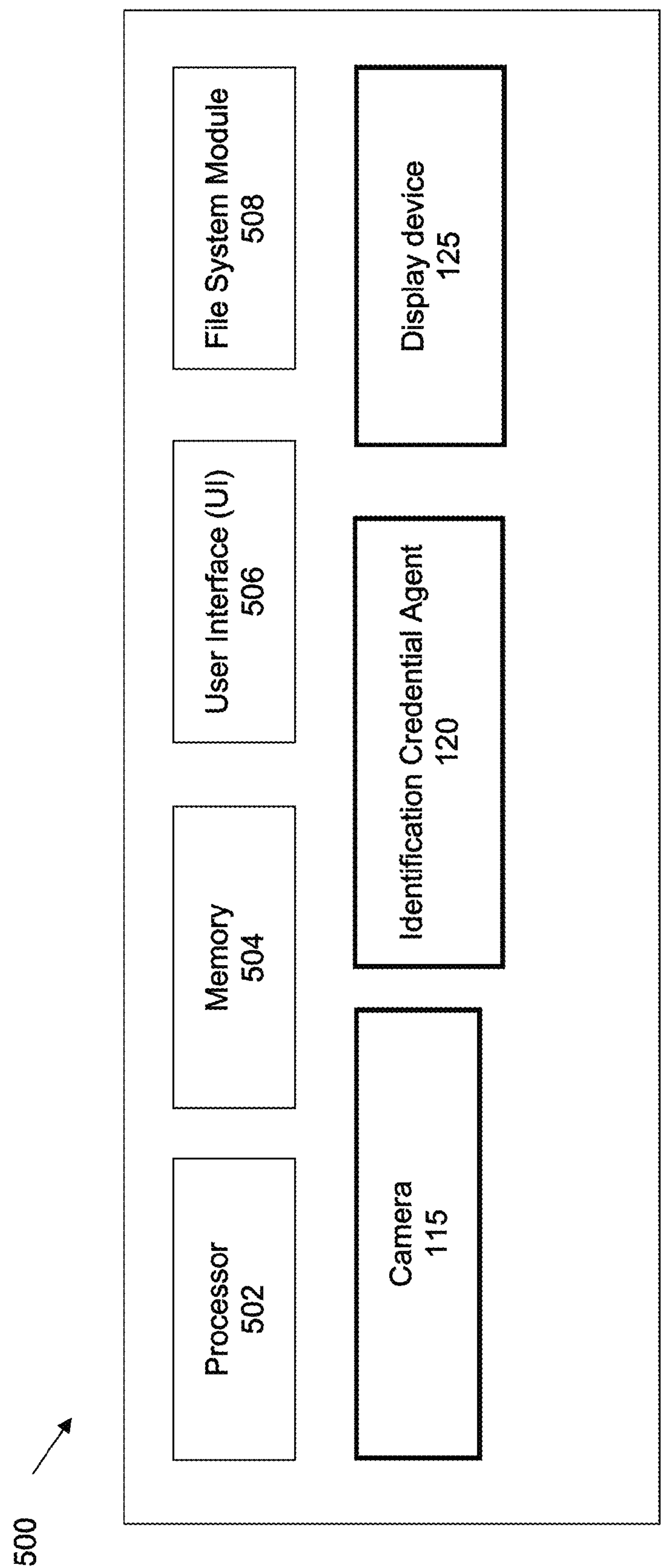
FIG. 4 illustrates a block diagram of a user device according to the embodiment of FIG. 1.

Identification credential client devices and servers as set forth above can be implemented in various computing devices. FIG. 4 illustrates a block diagram of a computing system that can be used to implement one or more aspects of the functionality described herein. The computing system 500 can host or serve as, for example, client device 110, an identification credential server 140, or both, in an identification system environment (e.g., 100 in FIG. 1). The computing system 500 can include at least one processor 502 and at least one memory 504. The processor 502 can be hardware that is configured to execute computer readable instructions such as software. The processor 502 can be a general processor or be an application specific hardware (e.g., an application specific integrated circuit (ASIC), programmable logic array (PLA), field programmable gate array (FPGA), or any other integrated circuit). The processor 502 can execute computer instructions or computer code to perform desired tasks. The code, for instance, can perform the algorithm shown in FIG. 3 or the variants of this algorithm described throughout this specification. The memory 504 can be a transitory or non-transitory computer readable medium, such as flash memory, a magnetic disk drive, an optical drive, a programmable read-only memory (PROM), a read-only memory (ROM), or any other memory or combination of memories. The computing system 500 can also include, for example, a user interface 506 and a file system module 508. As set forth in connection with FIG. 1, the system can also include a camera 115, an identification credential agent 120, and a display device 125 (which can be, for example, a touch screen capacitive sensor display device).

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method of acquiring an image of a user's credential document through a user device, comprising:

capturing information from a user interface regarding a particular type of credential document to be imaged;

receiving a video stream of the user's credential document from a camera of the user device;

displaying the video stream on a display of the user device;

determining whether the following criteria for capturing the image of the user's credential document are satisfied:

the video stream includes a complete surface of the user's credential document, the video stream indicates that the user's credential document is within a threshold distance of the user device, the video stream indicates that the user's credential document is in focus, and the video stream of the user's credential document is recognized to match the particular type of credential document to be imaged from the captured information;

if the criteria are not satisfied, presenting a first indication on the user device that the user's credential document is not ready to be imaged; and if the criteria are satisfied, presenting a second indication on the user device that the user's credential document is ready to be imaged and capturing an image of the user's credential document.

2. The method of claim 1, wherein the particular type of credential document is selected from a group consisting of an identification card, a driver's license, a passport, a credit card, and a debit card.

3. The method of claim 1, wherein the particular type of credential document is selected from a group consisting of a country, a state, a province, and a financial institution.

4. The method of claim 1, further comprising capturing information from a user interface regarding a particular side of the credential document to be imaged, wherein the particular side is a front or a back.

5. The method of claim 1, wherein:

the first indication is a transparent layer overlaying the video stream, wherein the transparent layer is surrounded by a frame in a first color; and the second indication is the transparent layer surrounded by the frame in a second color different from the first color.

6. The method of claim 1, wherein:

the first indication is a translucent layer overlaying the video stream, wherein the translucent layer is in a first color; and the second indication is the translucent layer in a second color different from the first color.

7. The method of claim 6, wherein the layer has a similar aspect ratio as the user's credential document; and the layer has a first orientation that is changeable based on a second orientation of the user's credential.

8. The method of claim 6, wherein the first color is red and the second color is green.

9. The method of claim 1, further comprising applying an optical character recognition technique to the image to identify and extract information related to the user's credential document.

10. The method of claim 2, further comprising determining whether a plurality of characteristics captured with the camera about the credential document conform with the type of credential document.

11. The method of claim 3, further comprising determining whether a plurality of characteristics captured with the camera about the credential document conform with issuing party information.

12. The method of claim 4, further comprising determining whether a plurality of characteristics captured with the camera about the credential document conforms with the side information.

13. The method of claim 1, further comprising:

acquiring a first photo of the user's face; and determining whether the first photo matches a second photo on the user's credential.

14. A non-transitory computer readable medium that is configured to execute computer readable instructions to cause a computer to perform the following steps to acquire an image of a user's credential document through a user device, comprising:

capturing information from a user interface regarding a particular type of credential document to be imaged;

receiving a video stream of the user's credential document from a camera of the user device;

displaying the video stream on a display of the user device;

determining whether the following criteria for capturing the image of the user's credential document are satisfied:

the video stream includes a complete surface of the user's credential document, the video stream indicates that the user's credential document is within a threshold distance of the user device, the video stream indicates that the user's credential document is in focus, and the video stream of the user's credential document is recognized to match the particular type of credential document to be imaged from the captured information;

if the criteria are not satisfied, presenting a first indication on the user device that the user's credential document is not ready to be imaged; and if the criteria are satisfied, presenting a second indication on the user device that the user's credential document is ready to be imaged and capturing an image of the user's credential document.

15. The non-transitory computer readable medium of claim 14, wherein:

the first indication is a transparent layer overlaying the video stream, wherein the transparent layer is surrounded by a frame in a first color; and the second indication is the transparent layer surrounded by the frame in a second color different from the first color.

16. The non-transitory computer readable medium of claim 14, wherein:

the first indication is a translucent layer overlaying the video stream, wherein the translucent layer is in a first color; and the second indication is the translucent layer in a second color different from the first color.

17. The non-transitory computer readable medium of claim 16, wherein the translucent layer has a similar aspect ratio as the user's credential document; and the translucent layer has a first orientation that is changeable based on a second orientation of the user's credential.

18. A device for acquiring an image of a user's credential document, comprising:

a user interface to capture information regarding a particular type of credential document to be imaged;

a camera to receive a video stream of the user's credential document;

a display to display the video stream;

a memory that stores instructions;

a processor to run the instructions stored in the memory to cause the processor to:

determine whether the following criteria for capturing the image of the user's credential document are satisfied:

the video stream includes a complete surface of the user's credential document, the video stream indicates that the user's credential document is within a threshold distance of the device, the video stream indicates that the user's credential document is in focus, and the video stream of the user's credential document is recognized to match the particular type of credential document to be imaged from the captured information;

if the criteria are not satisfied, present a first indication on the display that the user's credential document is not ready to be imaged; and if the criteria are satisfied, present a second indication on the display that the user's credential document is ready to be imaged and capture an image of the user's credential document.

19. The device of claim 18, wherein:

the first indication is a transparent layer overlaying the video stream, wherein the transparent layer is surrounded by a frame in a first color; and the second indication is the transparent layer surrounded by the frame in a second color different from the first color.

20. The device of claim 18, wherein:

the first indication is a translucent layer overlaying the video stream, wherein the translucent layer is in a first color; and the second indication is the translucent layer in a second color different from the first color.

* * * * *